United States Patent [19]

Kuroda

[11] 4,209,354

[45] * Jun. 24, 1980

[54] METHOD OF MAKING AN APPLIQUE ARTICLE

[75] Inventor: Minoru Kuroda, Amagasaki, Japan

[73] Assignees: Nishizawa Shoji Co. Ltd., Amagasaki, Japan; Dimension Weld Internal Corporation, Stamford, Conn.

[*] Notice: The portion of the term of this patent subsequent to Dec. 21, 1988, has been disclaimed.

[21] Appl. No.: 764,917

[22] Filed: Feb. 2, 1977

Related U.S. Application Data

[63] Continuation of Ser. No. 646,960, Jan. 7, 1976, and a continuation-in-part of Ser. No. 112,403, Feb. 3, 1971, abandoned, which is a continuation of Ser. No. 792,719, Jan. 21, 1969, abandoned, said Ser. No. 646,960, is a continuation-in-part of Ser. No. 393,791, Sep. 4, 1973, abandoned, which is a continuation of Ser. No. 113,088, Feb. 5, 1971, abandoned, said Ser. No. 792,719, and Ser. No. 113,088, each is a continuation-in-part of Ser. No. 662,962, Aug. 24, 1967, abandoned.

[30] Foreign Application Priority Data

Dec. 19, 1966 [JP] Japan .................................. 41-83085
Dec. 19, 1966 [JP] Japan .......................... 41-115532[U]
Dec. 19, 1966 [JP] Japan .......................... 41-115533[U]
Dec. 19, 1966 [JP] Japan .......................... 41-115535[U]

[51] Int. Cl.$^2$ ............................................. B32B 31/00
[52] U.S. Cl. ..................................... 156/219; 156/251
[58] Field of Search ............... 156/219, 200, 289, 251, 156/515, 268, 250; 428/202, 40-42, 352, 159

[56] References Cited

U.S. PATENT DOCUMENTS

| | | | |
|---|---|---|---|
| 3,499,813 | 3/1970 | Schickedanz | 156/251 X |
| 3,629,034 | 12/1971 | Kuroda | 156/251 X |
| 3,629,035 | 12/1971 | Kuroda | 156/251 X |
| 3,666,604 | 5/1972 | Coffet | 156/209 X |

FOREIGN PATENT DOCUMENTS 695955  5/1957  Canada ..................................... 428/159

*Primary Examiner*—David A. Simmons
*Attorney, Agent, or Firm*—Michael J. Striker

[57] ABSTRACT

A method of applying an applique to a support, comprising the steps, of providing a cover layer of synthetic plastic sheet material having a design surface with an outer contour line, a narrow outer bonding zone along the outer contour line and at least one inner bonding zone spaced inwardly from the outer bonding zone; further providing an intermediate layer of a resiliently compressible latently adhesive thermoplastic material having spaces filled with a gaseous medium; sandwiching the intermediate layer between the cover layer and a support material; and pressing against the cover layer die means having outer and inner pressure faces corresponding to the outer and inner bonding zones and a raised cutting edge fixed along the outer pressure face and corresponding to the contour line, while activating the latently adhesive thermoplastic material of the intermediate layer and thereby bonding the cover layer by the intermediate layer in the outer and inner bonding zones to the support material while severing the cover layer and intermediate layer along the outer contour line, the presence of the intermediate layer resulting in formation of a cushion between the support material and the cover layer in the area surrounded by the outer bonding zone upon bonding of the cover layer to the support material.

3 Claims, 12 Drawing Figures

METHOD OF MAKING AN APPLIQUE ARTICLE

CROSS-REFERENCE TO RELATED APPLICATIONS

This is a continuation of application Ser. No. 646,960, filed Jan. 7, 1976, which in turn is a continuation-in-part of my copending application Ser. No. 393,791, filed Sept. 4, 1973, now abandoned which is a continuation of application Ser. No. 113,088 filed Feb. 5, 1971, now abandoned, that was in turn a continuation-in-part of application Ser. No. 662,962 filed Aug. 24, 1967, now abandoned; and it is a continuation-in-part of my copending application Ser. No. 112,403, filed Feb. 3, 1971, now abandoned which is a continuation of application Ser. No. 792,719 filed Jan. 21, 1969, now abandoned, that was a continuation-in-part of application Ser. No. 662,962 filed Aug. 24, 1967, now abandoned.

BACKGROUND OF THE INVENTION

The present invention relates generally to a method of making applique articles.

Applique articles made by means of embroidery or similar methods are already known, as are adhesive emblems or patches which are of the so-called self-adhesive type and ready to be affixed to desired carriers. What to my knowledge is not known, however, are three-dimensional applique articles wherein part of a desired design is in relief as a result of padding with resiliently compressible filler material—as disclosed in my aforementioned copending applications to which reference may be made. The invention relates to applique articles which are permanently fixed to a substrate, and to others which are self-adhesive and may be affixed to any desired support or surface in the manner of adhesive patches or plaques.

SUMMARY OF THE INVENTION

It is an object of my invention to provide a method of making padded three-dimensional adhesive applique articles.

A more specific object of my invention is to provide a method of making such applique articles which are self-adhesive and may be affixed to any desired surface in a most simple and speedy manner.

An additional object of the present invention is to provide a method of making applique articles of the type under discussion which are of exceptionally pleasing appearance and may find use in an exceedingly wide variety of different applications.

Another object of this invention is to provide a new and useful method for the application of thermoplastic applique designs to clothing and other articles which permits the applique design to bond securely to a substrate and to present a stereoscopic and perspective appearance in its final form.

Pursuant to the above objects, and others which will become apparent hereafter, one feature of my invention resides in providing a method of making applique articles of the type in question. My method comprises the provision of a base layer of sheet material and the interposition of a filler layer of resiliently compressible padding material, such as a layer of open-celled or closed-celled synthetic plastic foam material, between a cover layer of sheet material and the base layer. Thereupon, at least the filler layer and the cover are severed along a borderline which is inwardly spaced from the edges of the layers and which is coincident with the outline of the finished applique article. Finally, I simultaneously bond selected portions of the cover and base layers to one another within the confines of the aforementioned borderline and across the corresponding interposed portions of the filler layer while pressing the selected portions together with concomitant reduction in the thickness of the interposed portions of the filler layer, and thereby the remaining portions of the cover layer constitute at the exposed side of the latter a raised resilient design which is filled with the remaining portions of the padding layer. I thus obtain a resilient padded three-dimensional applique article.

If I use a foam material it is advantageously a thermoplastic foam and the bonding of the selected portions of the top and base layers to one another involves the application of heat which serves to melt the interposed portions of the foam layer whereby the selected portions of the top and base layers become bonded to these interposed portions. Of course, the melting of these interposed portions results in simultaneous reduction of their thickness.

However, other materials are also suitable for the padding layer. Thus, natural or synthetic fibrous layers, for instance consisting of Dynel (TM) can also be used as long as they are of resiliently compressible nature.

A great variety of different materials may be used for the base and cover layers. For instance, both the cover and the base layer may consist of synthetic plastic material, such as thermoplastic material, or only one of them may consist of such material and the other may consist of a textile material, or again both the cover layer and the base layer may consist of textile material. Among the synthetic plastic materials suitable for the cover layer and/or the base layer is vinyl which is particularly advantageous, but which is by no means the only synthetic plastic material suitable for the purposes of the present invention.

The variety of possible designs or configurations for the adhesive applique article according to the novel method is of course almost unlimited. Clearly, pictorial representations may be provided on such an article, numerals, letters, symbols, emblems, and the like. Also, the "design" on the applique article, which term hereafter will be used broadly to designate both the characteristic appearance provided on the article by the raised and/or depressed portions as well as by any printing, coloring or the like provided on the cover or any other layer, may vary widely.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

An apparatus for carrying the method into effect essentially comprises a mold platen 1 and a heating platen 2 connected thereto by, for instance, bolts 14.

Figure 1:
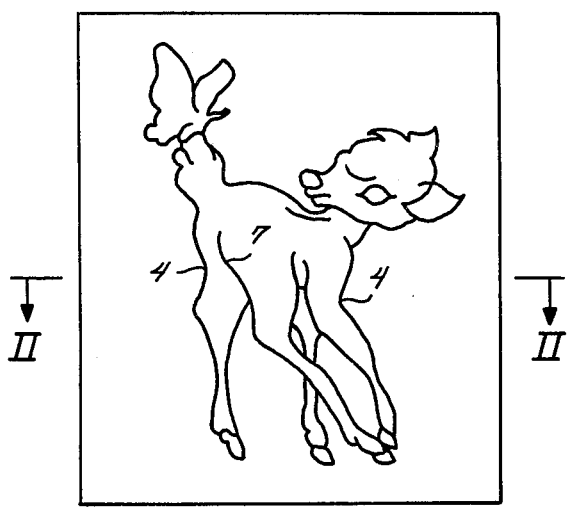
FIG. 1 is a plan view of a mold platen having a bladed patern representing a fawn for illustration purposes.
Figure 2:
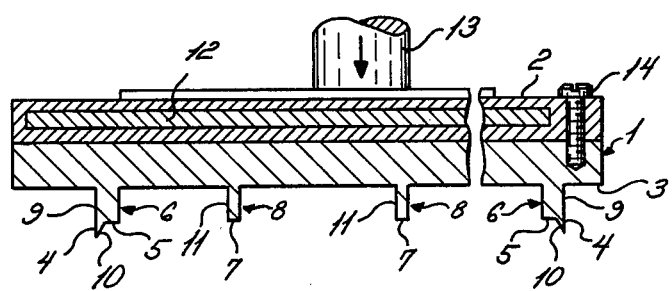
FIG. 2 is a sectional view taken on the line II—II of FIG. 1.

The mold platen 1, as cross-sectionally shown in FIG. 2, is provided at its undersurface 3 with a bladed projection 6 having a sharp edge 4 and a flat face 5 and with a blunt projection 8 having a flat head 7. The sharp edge 4 of the bladed projection 6 has a verticle sidewall 9 adjoining to the unprinted area of the applique design and an inclined sidewall 10 adjoining to the applique design. The flat face 5 extends substantially horizontally from the upper end of the inclined sidewall 10.

The distance H between the lowermost point of the sharp edge 4 and the flat face 5 should preferably be smaller than the thickness S of the applique sheet. The width W of the flat face 5 may advantageously be wide enough to cover at least a portion of the outer bonding zone of the applique design.

The blunt projection 8 has a horizontal flat head 7 and vertical sidewalls 11 and coincides with an inner bonding zone L', while the flat head 7 is flush with the flat face 5. The width W' of the flat head 7 may advantageously be wide enough to cover at least a portion of the inner bonding zone L'.

Referring to FIG. 2, a heater 12 such as, for example, a high frequency heating device, may be mounted in the heating platen 2. There is provided a lifting rod 13 for moving the mold in the direction of the arrow.

The applique sheet 14 may be of a thermoplastic resin, for example polyvinyl chloride. The foamed plastic sheet 15 may be of a material similar to that of the applique sheet 14 or other suitable thermoplastic material. The applique sheet 14 is placed on the foamed plastic sheet 15 and superimposed upon a base sheet 16 of a suitable material. These sheets are then compressed by the heated mold platen 1 with the bladed projection 6 and blunt projections 8 held in registry with the outer bonding zone L and inner L', respectively.

The mold moves downwardly until the sharp edge 4 reaches the base sheet 16, whereby the applique sheet 14 and the foamed plastic sheet 15 are fused and cut along the outline L. It will be appreciated that the foam layer 15 is useful for its plasticity to act as an adhesive to bond the applique sheet to the base sheet along the bonding zone of the printed design, and for its elasticity to permit the land of the design to remain uncompressed.

Figure 3:
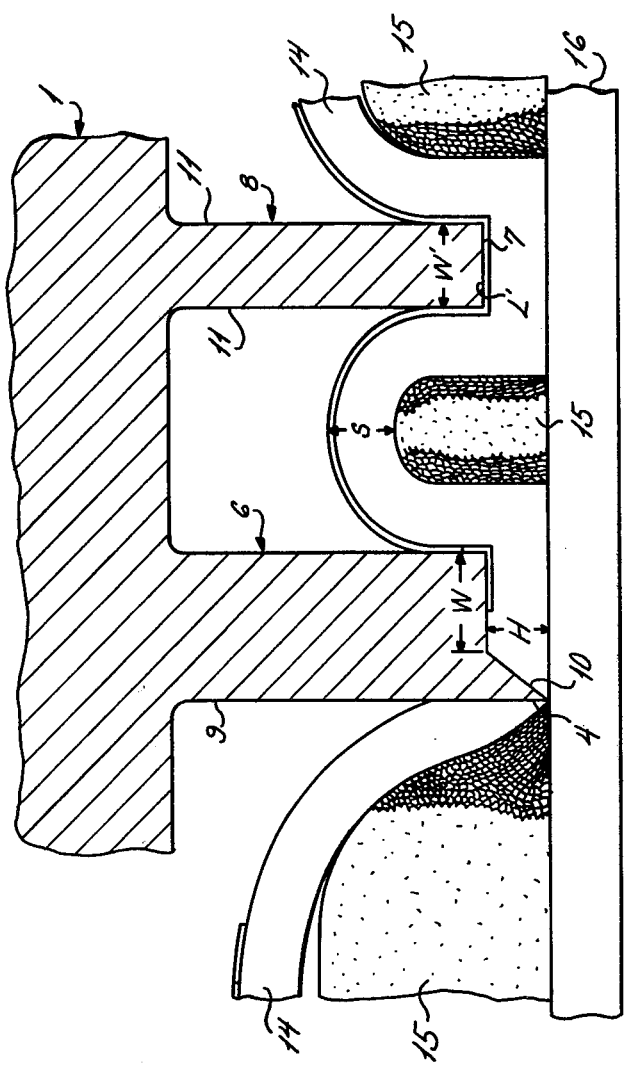
FIG. 3 schematically illustrates a part of the mold as being pressed against an applique sheet on enlarged scale.
Figure 4:
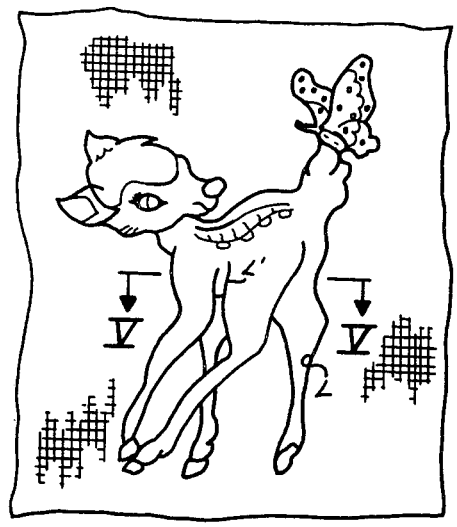
FIG. 4 is a plan view of a sheet of cloth to which the applique design is applied in accordance with the invention.
Figure 5:
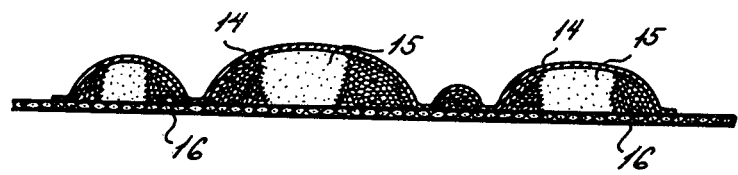
FIG. 5 is a magnified sectional view taken on line V—V of FIG. 4.

Referring now to FIGS. 3 and 5, the sharp edge 4 of the bladed projection 6 is held in contact with the base sheet 16 thereby separating the outer blank portion of the applique sheet 14 from the design portion.

The sharp edge 4 severes the applique sheet along the outline or outer contour line of the design and provides a clear-cut outer contour line. While the applique sheet is still in a plastic state, the outer blank portion may be easily removed from the design portion.

The printed areas of the applique design hemmed in by the outer and inner bonding zones are caused to swell by the action of the foam layer 15 to create the stereoscopic and perspective features.

The applique design thus finished is firmly fixed to the base sheet along its outer and inner bonding zones and it is thereby highly resistant to friction and tension.

It will be apparent to those skilled in the art that various changes may be made in the invention without departing from the spirit and scope thereof. For example, the bladed portion 6 may have an inwardly curved sidewall instead of the inclined sidewall 10. The blunt portion 8 may have inclined or curved sidewalls instead of the vertical sidewalls 11.

Figure 6:
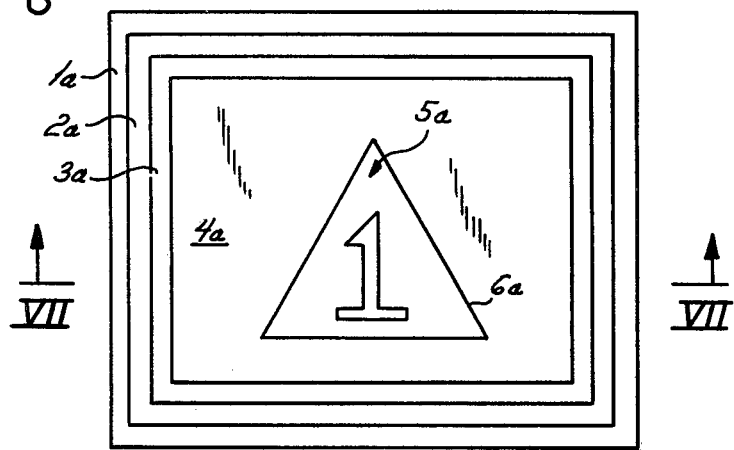
FIG. 6 is a plan view showing the various layers required for producing an adhesive applique article in accordance with another embodiment of my method, the illustration being of the layers prior to adhering of the layers together.
Figure 7:
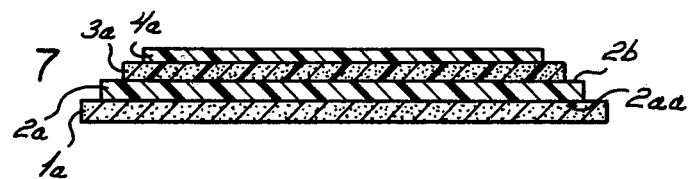
FIG. 7 is a section taken on the line VII—VII of FIG. 6.

Referring now to FIGS. 6 and 7 of the drawing which show another embodiment of the invention, it will be seen that I have shown four different layers superimposed upon one another. To increase the clarity of illustration the layers, identified with reference numerals 1a, 2a, 3a and 4a are shown as being of different sizes. In actual fact it will, however, usually be advantageous if the layers are coextensive or substantially coextensive although this is a matter of convenience and does not affect the present invention.

Reference numeral 4a in the illustrated embodiment identifies a cover layer of sheet material which may be synthetic plastic material but could also for instance be a textile material or the like. For purposes of the present description it will be assumed that the layer 4a is of synthetic plastic material. In the illustrated embodiment the layer 4a has imprinted on its exposed surface a pictorial representation of the applique article which it is desired to obtain. It will be seen that this representation is generally identified with reference numeral 5a and comprises the outline of the numeral one located in a triangular patch whose borderlines are identified with reference numeral 6a. In other words, the adhesive applique article which it is intended to produce is to be of triangular shape and to be provided with the numeral one.

The outline 6a and the numeral 1 may be embossed into the layer 4a be printed, painted or otherwise applied onto the exposed surface of the layer 4a or, if the latter should be transparent or translucent, even on its concealed surface, be partly provided on the exposed and partly on the concealed surface if the layer 4a consists of transparent or translucent material, or they may be provided in any other suitable manner whatsoever.

The layer 4a is superimposed upon a layer 3a of padding material, here shown as consisting of synthetic plastic foam material, advantageously a thermoplastic foam. The layer 3a in turn is superimposed upon a base layer 2a of sheet material which analogously to the layer 4a may consist of different materials but for purposes of the present description is assumed to be a synthetic plastic material. The underface of the layer 2a is provided with an adhesive backing 2aa, for instance simply in form of a coating of adhesive material 2aa applied onto this undersurface. It is readily evident that a great variety of adhesives will be suitable for the purposes at hand. Thus, there are latent adhesives which must in some way be activated, and there are active adhesives which are constantly in activated state. A detailed description of these adhesives is not believed necessary because they are very well known to those skilled in the art. It is evident, however, that if the layer or coating 2aa consists of an active adhesive, it must be protected until the time of use of the applique article. Therefore, FIGS. 6 and 7 show a layer 1a of so-called "release paper" applied over the coating 2aa. The term "release paper" is conventional in this field and is not necessarily limited to a layer of paper but rather identifies a material which so adheres to the coating 2aa of adhesive material as to protect the coating but can be readily peeled off without damaging the coating 2aa, thereby exposing the latter and readying it for application of the applique article to a desired surface.

Figure 8:
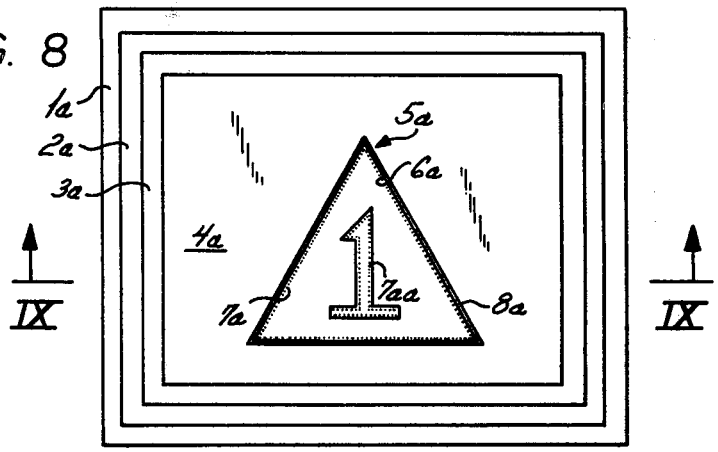
FIG. 8 is similar to FIG. 6 but illustrates the layers after they have been adhered together.
Figure 9:
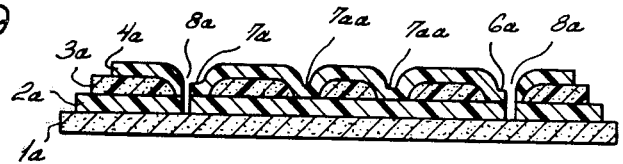
FIG. 9 is a section taken on the line IX—IX of FIG. 8.

Coming now to FIGS. 8 and 9 it is pointed out that therein I have illustrated the next-following steps in the conversion of the multi layer blank of FIGS. 6 and 7 into an adhesive applique article according to the present invention. The same reference numerals as in FIGS. 6 and 7 apply also in FIGS. 8 and 9. However, in FIGS. 8 and 9 I have shown that the layers 2a, 3a and 4a have been severed along a borderline or outer contour line 8a which is inwardly spaced from the edges of the layers 2a, 3a and 4a and which, in the illustrated embodiment, extends along the design outline 6a just outwardly adjacent thereto. Evidently the borderline 8a, which may also be thought of as the severing line, could also be directly coincident with the outline 6a or be located inwardly thereof. In the illustrated embodiment it is assumed that in the finished applique article it is desired to have the outline 6a which—may be printed or otherwise applied—be visible.

In addition to severing of the layers 2a, 3a and 4a along the severing line 8a (compare FIG. 9) selected portions of the cover layer 4a have also been bonded to corresponding portions of the base layer 2a across the corresponding interposed portions of the foam layer 3a. In FIGS. 8 and 9 these selected portions are in form of a narrow outer bonding zone 7a located inwardly and extending along the outline 6a, as well as inner bonding zone 7aa located inwardly and extending along the outline of the numeral one. This bonding is accomplished by pressing the selected portions (zones 7a and 7aa) of the layers 4a and 2a together and thereby reducing the thickness of the interposed foam layer 3a, or more particularly of the interposed portions of the foam layer 3a, and effecting the requisite bonding. The foam layer 3a may, as pointed out before, consist of thermoplastic foam material and can thus be thought of as a latently adhesive material which will effect bonding of the layers 4a and 2a at the aforementioned zones 7a and 7aa if subjected to sufficiently elevated temperature for the foam material of the layer 3a to become activated that is to enter into a bond with the material of the layers 2a and 4a. The pressure and application of elevated temperatures result in melting of the foam of the layer 3a along the zones 7a and 7aa and the foam thus bonds the layers 2a and 4a together. It will be appreciated that if the one or both of the layers 2a and 4a consist of a textile material the melted foam will party penetrate into the interstices in such material whereas, if one or both of the layers 2a and 4a consist of synthetic plastic material, the material of these layers 2a and 4a may itself partly melt and bond with the material of the layer 3a.

In any case, the resultant cross-sectional configuration illustrated in FIG. 9 shows that the applique article 5a is surrounded by the severed remaining portions of the layers 2a, 3a and 4a and comprises depressed zones 7a and 7aa and raised zones between these depressed zones, so that the article 5a constitutes a foam-filled resilient three-dimensional applique article on which the numeral one is outlined by the zone 7aa.

Figure 10:
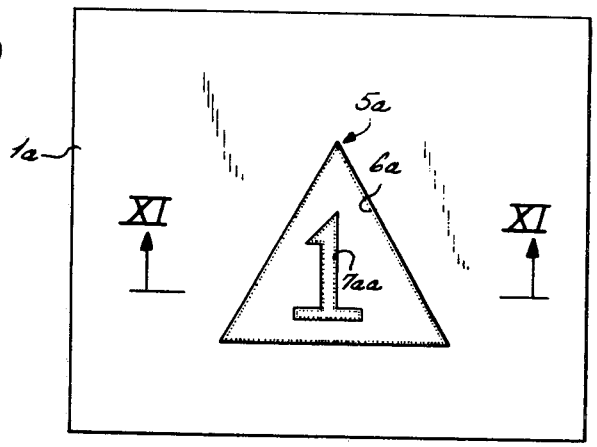
FIG. 10 is a plan view of FIG. 8, but with the excess material of the layers removed and only the applique article remaining on its release paper.
Figure 11:
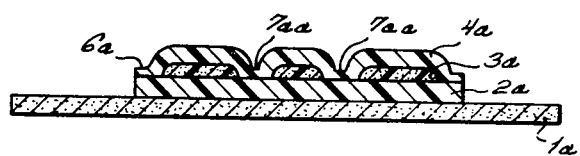
FIG. 11 is a section taken on the line XI—XI of FIG. 10.

FIG. 9 shows that in the exemplary embodiment illustrated the release paper or release layer 1a has not been severed along the severing line 8a so that the applique article remain, as shown in FIG. 10, adhesively attached to its release layer or release paper 1a which latter retains its original dimensions. FIG. 11 shows this quite clearly. It will be appreciated, of course, that it is possible to sever the release layer 1a at the same time as the layers 2a, 3a and 4a are severed, and also along the severing line 8a. However, it is generally desirable to take the approach shown in FIGS. 10 and 11 because, when the release paper 1a projects laterally beyond the applique article 5a, it can be more readily peeled off by bending it away from the underside of the applique article.

Figure 12:
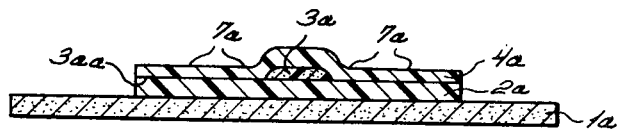
FIG. 12 is a view similar to FIG. 11 but illustrating another embodiment of the invention.

The embodiment illustrated in FIG. 12 is somewhat different from the preceding embodiment. FIG. 12 is a section analogous to the one shown in FIG. 11. The layers are again identified with the same reference numerals as in the preceding figures. However, in the embodiment of FIG. 12, it is assumed that the numeral one is to appear raised whereas the remainder of the applique article is to be depressed below the level of numeral one. Accordingly, the areas 7a in which selected portions of the layers 2a and 4a are bonded together are considerably larger than the narrow zones identified with reference numeral 7a in the preceding Figures and include the entire surface area of the layer 4a with the exception of the raised surface portion of the layer 4a corresponding to the configuration of numeral one. Reference numeral 3aa in FIG. 12 shows how the portions of the layer 3a which are intermediate the thus bonded portions of the layers 2a and 4a, have been compressed and melted to provide the desired bonding, whereas the remainder of the foam layer 3a, that is the portion thereof which is interposed between the nonbonded portions of the layers 2a and 4a, retains its original thickness and thus constitutes padding for the raised three-dimensional numeral one which is, accordingly, foam filled as visible in FIG. 7.

In FIGS. 6–12 the configuration and the design of the novel applique article have been shown on hand of a very simple example. It is evident that this is not to be considered limiting and that not only numerals, but also lettering, symbols or entire pictorial representations of flowers, animals, inanimate objects and, in fact, of anything which can be pictorially represented, may be similarly provided on the novel adhesive applique article. Any selected portions of such designs may be provided either raised or depressed, as desired.

The wide range of applicability of my novel invention is obvious and requires no elaboration. By way of example it need merely be suggested that adhesive applique articles made according to the present method may be provided in form of "stick-on" patches for garments, in form of adhesive signs or adhesive advertising stickers, in form of decorative panels to be affixed to furniture or the like, as wallpaper having foam-filled, resilient three-dimensional characteristics, and in any other of an exceedingly great variety of applications which will offer themselves to those conversant with the art.

Also, while certain materials have been mentioned as suitable by way of example, it should be clearly understood that many other materials can also be used, just as a variety of different effects may be produced if, for instance, the cover layer 4a is translucent or transparent, and if different types of colors, inks or the like are used to provide a design either on the exposed face of the layer 4a, the concealed face of this layer, partly on one and partly on the other of these faces, partly on the layer 4a and partly on the exposed face of the layer 3a, and the like. All of this is mentioned to suggest the great versatility of the present invention.

It will be understood that each of the elements described above, or two or more together, may also find a use in other types of applications differing from the types described above.

It will also be understood that I may sever either only the top layer, the top layer and the filler or padding layer, or the top layer, the filler layer and the base layer or substrate layer. In fact, as indicated earlier, I may sever the release paper—if an adhesive is present and if it is protected by release paper—together with the top layer, filler layer and base layer.

It will be apparent to those skilled in the art that various changes may be made in the invention without departing from the spirit and scope thereof.

What is desired and claimed to be protected by Letters Patent is set forth in the accompanying claims:

1. A method of making an adhesive applique article, comprising the steps of providing a base layer of sheet material; providing an adhesive backing on only one surface of said base layer; providing a release layer; providing a cover layer of sheet material having a design surface with an outer contour line, a narrow outer bonding zone along said outer contour line and at least one inner bonding zone spaced inwardly from said outer bonding zone; further providing an intermediate layer of resiliently compressible latently adhesive material having spaces filled with a gaseous medium; forming a sandwich composed of said release layer, said base layer superimposed on said release layer with said adhesive backing thereof in contact with said release layer; said intermediate layer superimposed with one surface thereof on the other surface of said base layer and said cover layer superimposed on the other surface of said intermediate layer; and pressing said cover layer within said outer and inner bonding zones against said intermediate layer and said base layer while activating only said latently adhesive material and thereby bonding said cover layer by said latently adhesive material to said other surface of said base layer in said outer and inner bonding zones, and severing at least said cover layer and intermediate layer and base layer along said outer contour line, the presence of said intermediate layer resulting in formation of a cushion between said base layer and said cover layer in the area surrounded by said outer bonding zone upon bonding of said cover layer to said base layer.

2. A method as defined in claim 1, wherein the step of severing also comprises severing said release layer.

3. A method of applying an applique to a support, comprising the steps of providing a cover layer of synthetic plastic sheet material having a design surface with an outer contour line, a narrow outer bonding zone along said outer contour line, and at least one inner bonding zone spaced inwardly from said outer bonding zone; further providing an intermediate layer of a resiliently compressible latently adhesive thermoplastic material having spaces filled with a gaseous medium; sandwiching said intermediate layer between said cover layer and a support material; and pressing against said cover layer die means having outer and inner pressure faces corresponding to said outer and inner bonding zones and a raised cutting edge fixed along said outer pressure face and corresponding to said contour line, while activating said latently adhesive thermoplastic material of said intermediate layer and thereby bonding said cover layer by said intermediate layer in said outer and inner bonding zones to said support material while severing said cover layer and intermediate layer and support material along said outer contour line, the presence of said intermediate layer resulting in formation of a cushion between said support material and said cover layer in the area surrounded by said outer bonding zone upon bonding of said cover layer to said support material.

* * * * *